(12) United States Patent
Naito et al.

(10) Patent No.: US 7,819,421 B2
(45) Date of Patent: Oct. 26, 2010

(54) SIDE AIRBAG APPARATUS

(75) Inventors: Takashi Naito, Aichi-ken (JP); Yuji Sato, Aichi-ken (JP); Michio Inoue, Aichi-ken (JP); Daisuke Yamamura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 261 days.

(21) Appl. No.: 12/076,520

(22) Filed: Mar. 19, 2008

(65) Prior Publication Data

US 2008/0231026 A1 Sep. 25, 2008

(30) Foreign Application Priority Data

Mar. 20, 2007 (JP) ............................... 2007-073007

(51) Int. Cl.
*B60R 21/207* (2006.01)
*B60R 21/26* (2006.01)

(52) U.S. Cl. .................................... 280/730.2; 280/735

(58) Field of Classification Search ................. 280/729, 280/730.2, 735, 736, 741, 743.2
See application file for complete search history.

(56) References Cited

U.S. PATENT DOCUMENTS

| | | | | | |
|---|---|---|---|---|---|
| 5,413,378 | A | * | 5/1995 | Steffens et al. | 280/735 |
| 5,447,326 | A | * | 9/1995 | Laske et al. | 280/728.3 |
| 5,570,905 | A | * | 11/1996 | Dyer | 280/743.2 |
| 5,762,367 | A | * | 6/1998 | Wolanin | 280/736 |
| 5,924,721 | A | * | 7/1999 | Nakamura et al. | 280/730.2 |
| 6,170,871 | B1 | * | 1/2001 | Goestenkors et al. | 280/743.1 |
| 6,186,540 | B1 | * | 2/2001 | Edgren | 280/735 |
| 6,189,928 | B1 | * | 2/2001 | Sommer et al. | 280/743.2 |
| 6,349,964 | B1 | * | 2/2002 | Acker et al. | 280/730.2 |
| 6,422,597 | B1 | * | 7/2002 | Pinsenschaum et al. | 280/735 |
| 6,581,961 | B1 | * | 6/2003 | Bowers | 280/735 |
| 6,616,184 | B2 | * | 9/2003 | Fischer | 280/743.2 |
| 6,648,371 | B2 | * | 11/2003 | Vendely et al. | 280/739 |
| 6,749,217 | B2 | * | 6/2004 | Damian et al. | 280/734 |
| 6,955,240 | B2 | * | 10/2005 | Ahn et al. | 280/736 |
| 7,156,418 | B2 | | 1/2007 | Sato et al. | |
| 7,475,904 | B2 | * | 1/2009 | Hofmann et al. | 280/739 |

(Continued)

FOREIGN PATENT DOCUMENTS

JP    A-2005-47471    2/2005

*Primary Examiner*—Faye M. Fleming
*Assistant Examiner*—Joseph Rocca
(74) *Attorney, Agent, or Firm*—Posz Law Group, PLC

(57) ABSTRACT

A side airbag apparatus has an airbag assembly that protects a passenger seated on a seat in a passenger compartment by being inflated and deployed at a side wall portion of the passenger compartment corresponding to the seat in a collision of a vehicle. The airbag assembly includes a main airbag and an auxiliary airbag that inflate and deployed in a state arranged along a lateral direction of the vehicle. If the body size of the passenger is greater than or equal to a predetermined size, the main airbag is inflated and deployed and the auxiliary airbag is not inflated or deployed. If the body size of the passenger is smaller than the predetermined size, the main airbag and the auxiliary airbag are both inflated and deployed. Thus, in the latter case, the airbag assembly in the inflated and deployed state has a great thickness in the lateral direction of the vehicle compared to the case in which the body size of the passenger is greater than or equal to the predetermined size.

13 Claims, 10 Drawing Sheets

U.S. PATENT DOCUMENTS

| | | | |
|---|---|---|---|
| 7,600,777 B2 * | 10/2009 | Suzuki et al. | 280/730.2 |
| 2003/0168836 A1 * | 9/2003 | Sato et al. | 280/730.2 |
| 2004/0021304 A1 * | 2/2004 | Tanase et al. | 280/729 |
| 2005/0057027 A1 * | 3/2005 | Fogle et al. | 280/739 |
| 2005/0184493 A1 * | 8/2005 | Hofmann et al. | 280/730.2 |
| 2006/0022439 A1 * | 2/2006 | Bayley et al. | 280/729 |
| 2006/0170202 A1 * | 8/2006 | Block et al. | 280/743.2 |
| 2007/0024033 A1 * | 2/2007 | Suzuki et al. | 280/730.2 |
| 2007/0102911 A1 * | 5/2007 | Hall et al. | 280/739 |

* cited by examiner

Fig.6

|  | Upper portion of the airbag assembly | | Lower portion of the airbag assembly | |
|---|---|---|---|---|
|  | Thickness in vehicle lateral direction | Internal pressure | Thickness in vehicle lateral direction | Internal pressure |
| Passenger of or larger than predetermined size | Small | High | Great (Fixed) | High (Fixed) |
| Passenger smaller than predetermined size | Great | Low | Great (Fixed) | High (Fixed) |

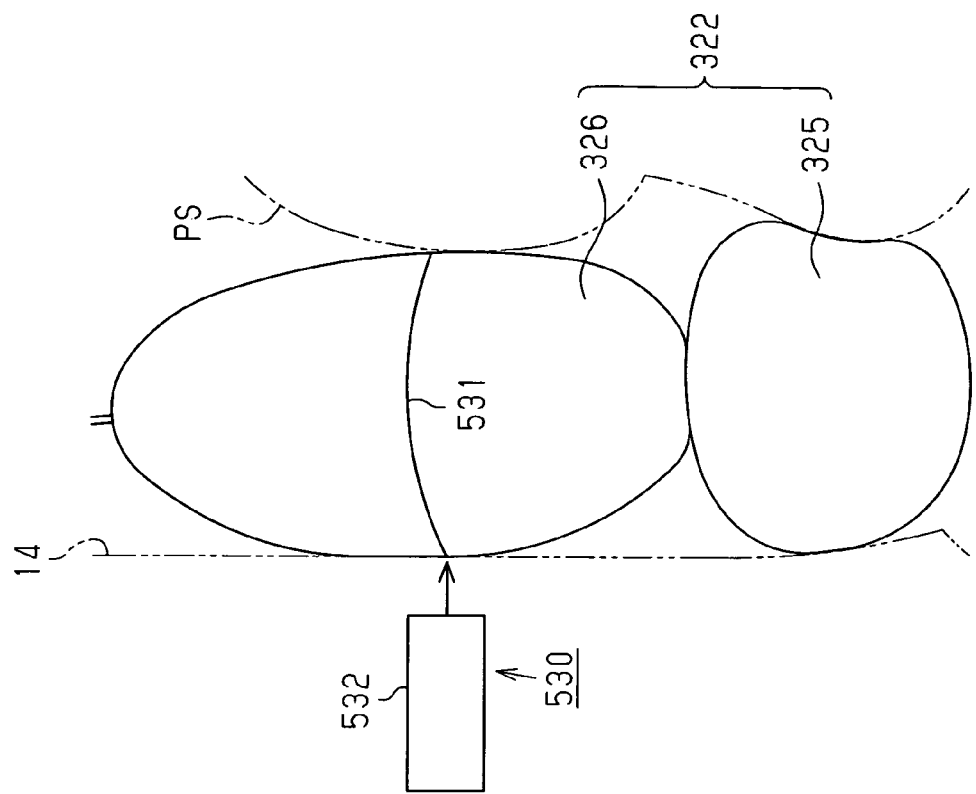
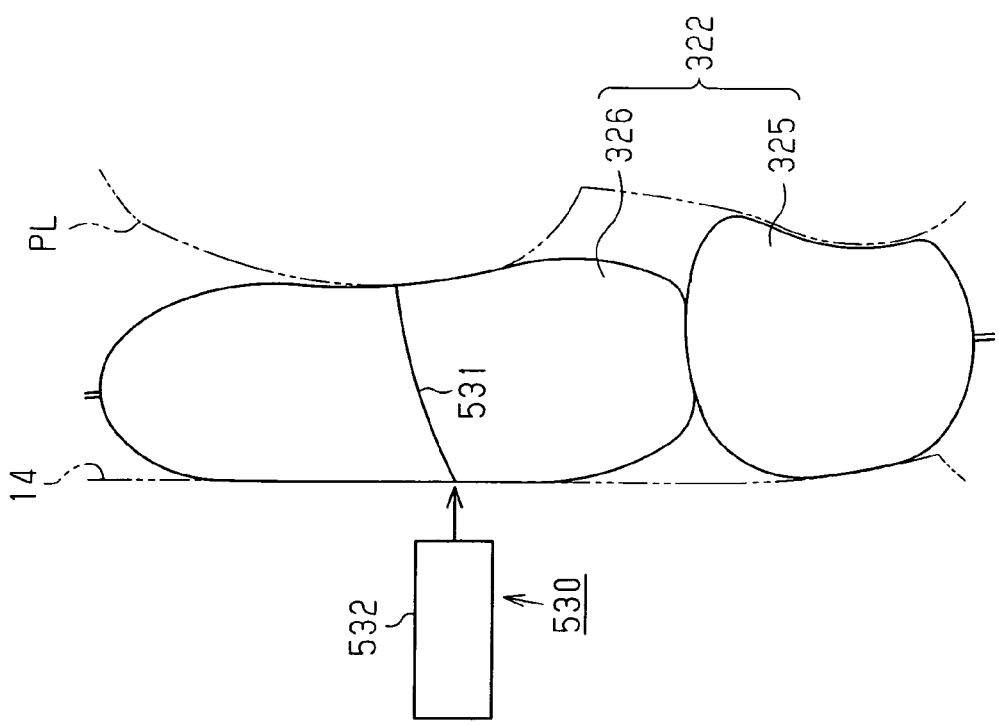

SIDE AIRBAG APPARATUS

BACKGROUND OF THE INVENTION

The present invention relates to a side airbag apparatus that inflates and deploys an airbag at a side wall portion of a passenger compartment corresponding to a seat in the passenger compartment on which a passenger is seated so as to protect the passenger in a collision of a vehicle.

Conventionally, Japanese Laid-Open Patent Publication No. 2005-47471, for example, discloses one such type of side airbag apparatus. FIGS. 12A and 12B illustrate a typical example of the side airbag apparatus of this publication.

As shown in FIGS. 12A and 12B, a seat 10 in a passenger compartment has a seat cushion 11 on which a passenger is seated and a seat back 12 supporting the back of the passenger. A side airbag apparatus 20 is accommodated in one of the sides of the seat back 12. The side airbag apparatus 20 includes an airbag 22 having a lower portion 22A and an upper portion 22B. If an impact pressure sensor detects pressure caused by an impact on a lateral portion of the vehicle, an inflator injects gas into the airbag 22. This inflates and deploys the airbag 22 at a side wall portion 14 in the passenger compartment corresponding to the seat 10 in order to protect a passenger on the seat 10.

Typically, the dimensions of the airbag 22 in the fully inflated and deployed state, particularly the thickness of the airbag 22 in the fully inflated and deployed state in a lateral direction of the vehicle, are set in accordance with a standard sized passenger PM shown in FIG. 12A. Thus, if the body size of the passenger seated on the seat 10 is relatively small, the following problem is caused. Specifically, if a relatively small sized passenger PS shown in FIG. 12B is seated on the seat 10, a gap is formed between the airbag 22 in the fully inflated and deployed state and the passenger PS as illustrated in the drawing. This may prevent the airbag 22 from effectively restraining the passenger PS.

In other words, the airbag may not be capable of restraining the passenger on the seat to its full performance depending on the body size of the passenger. This problem is common for all types of side airbag apparatuses.

SUMMARY OF THE INVENTION

Accordingly, it is an objective of the present invention to provide a side airbag apparatus that prevents the performance of an airbag for restraining a passenger from varying depending on the body size of the passenger.

To achieve the foregoing objective and in accordance with one aspect of the present invention, a side airbag apparatus mounted in a vehicle is provided. The apparatus includes an airbag that protects a passenger seated on a seat in a passenger compartment in a collision of the vehicle by being inflated and deployed at a side wall portion of the passenger compartment corresponding to the seat. If a body size of the passenger is smaller than a predetermined size, inflation and deployment of the airbag are controlled in such a manner that the airbag in a inflated and deployed state has a great thickness in a lateral direction of the vehicle compared to a case in which the body size of the passenger is greater than or equal to the predetermined size.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a table schematically representing operation of the side airbag apparatus of FIG. 4 in correspondence with the body size of a seated passenger;

FIGS. 11A and 11B are cross-sectional views representing operation of a side airbag apparatus according to another modification of the present invention.

DETAILED DESCRIPTION OF THE PREFERRED EMBODIMENTS

First Embodiment

A first embodiment of the present invention will now be described with reference to FIGS. 1 to 3.

Figure 1:
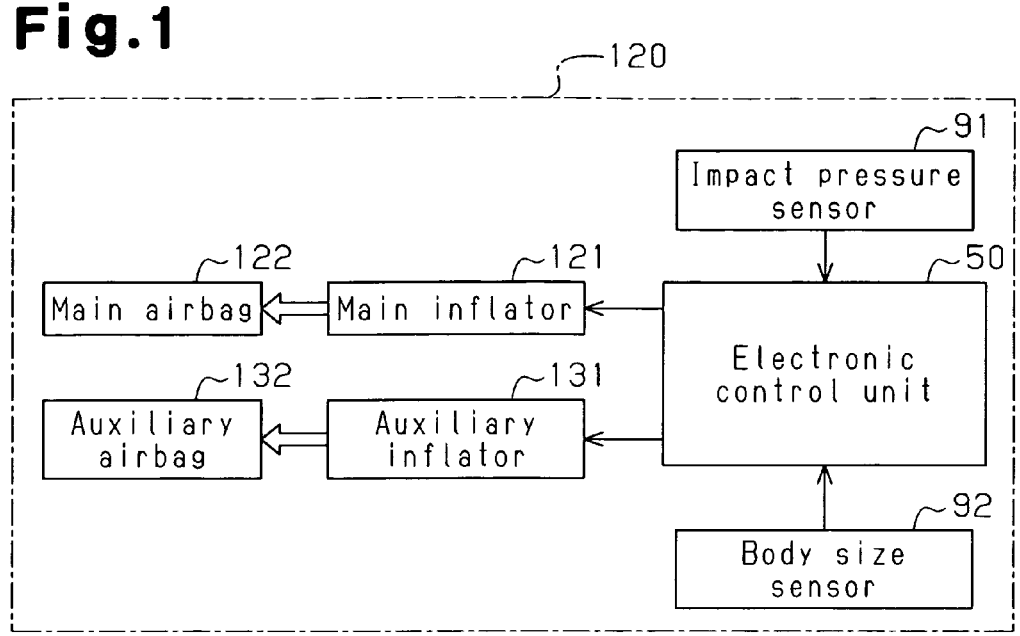
FIG. 1 is a block diagram representing the electric configuration of a side airbag apparatus according to a first embodiment of the present invention.

As illustrated in FIG. 1, a side airbag apparatus 120 according to the first embodiment has an airbag assembly including a main airbag 122 and an auxiliary airbag 132, a main inflator 121, and an auxiliary inflator 131. The main inflator 121 and the auxiliary inflator 131 inject gas into the main airbag 122 and the auxiliary airbag 132, respectively. The side airbag apparatus 120 has an electronic control unit 50, an impact pressure sensor 91, and a body size sensor 92. The electronic control unit 50 controls operation of the inflators 121, 131. The impact pressure sensor 91 detects pressure caused by an impact on a lateral portion of the vehicle in which the side airbag apparatus 120 is mounted. The body size sensor 92 detects the body size of a passenger seated on a corresponding seat of the vehicle. The impact pressure sensor 91 and the body size sensor 92 output detection results to the electronic control unit 50.

The body size sensor 92 is formed by, for example, an infrared sensor that acquires the body outline of the passenger or a mass sensor that acquires the weight of the passenger. Based on the detection result of the body size sensor 92, the electronic control unit 50 determines whether the body size of the seated passenger is smaller than a predetermined size. Also, based on the detection result of the impact pressure sensor 91, the electronic control unit 50 determines whether the level of an impact on the lateral portion of the vehicle is greater than or equal to a predetermined level. The electronic control unit 50 performs the determination as to the body size of the passenger prior to the determination regarding the impact pressure. It is preferred that the determination whether the body size of the passenger is smaller than the predetermined size be carried out at the point where the passenger sits on the seat, or, in other words, in a while after the passenger sits on the seat. The electronic control unit 50 controls inflation and deployment of the main airbag 122 and inflation and deployment of the auxiliary airbag 132 depending on the results of such determinations, as will be described below. The configuration of the main airbag 122 and that of the auxiliary airbag 132 will hereafter be described.

Figure 2:
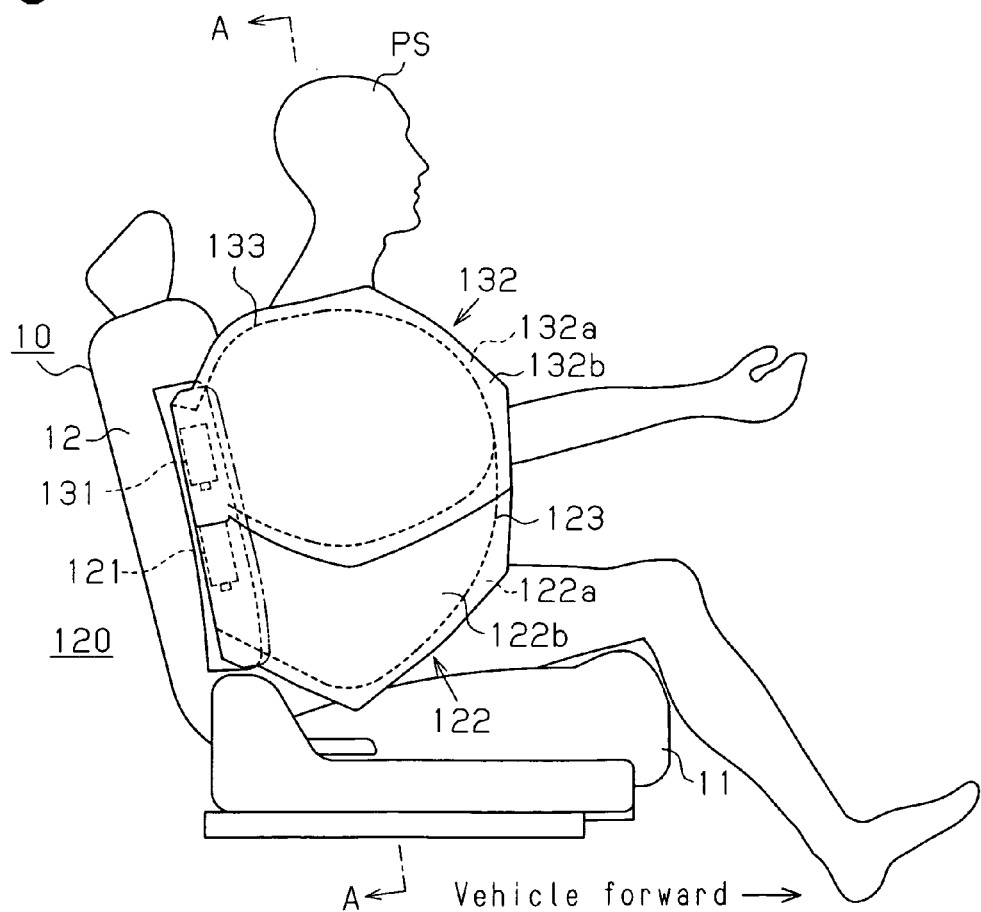
FIG. 2 is a side view illustrating fully inflated and deployed states of airbags of the side airbag apparatus of FIG. 1 mounted in a seat of a vehicle.

As shown in FIG. 2, the seat 10 includes the seat cushion 11 and the seat back 12. The main airbag 122 and the auxiliary airbag 132 are accommodated in one of the sides of the seat back 12 located closer to the exterior of the passenger compartment. The main airbag 122 and the auxiliary airbag 132 are inflated and deployed in a forward direction of the vehicle from the positions. The side of the seat back 12 also accommodates the main inflator 121 and the auxiliary inflator 131.

The main airbag 122 is formed by sewing peripheries of a pair of ground fabric sheets 122a, 122b, which are fireproof flexible non-woven fabric sheets, together at a seam 123. When the main airbag 122 is fully inflated and deployed, the outer surface of the ground fabric sheet 122a faces the interior of the passenger compartment and the outer surface of the ground fabric sheet 122b faces the exterior of the passenger compartment. The auxiliary airbag 132 is formed by sewing peripheries of a pair of ground fabric sheets 132a, 132b, which are fireproof flexible non-woven fabric sheets, together at a seam 133. When the auxiliary airbag 132 is fully inflated and deployed, the outer surface of the ground fabric sheet 132a faces the interior of the passenger compartment and the outer surface of the ground fabric sheet 132b faces the exterior of the passenger compartment.

Figure 3A:
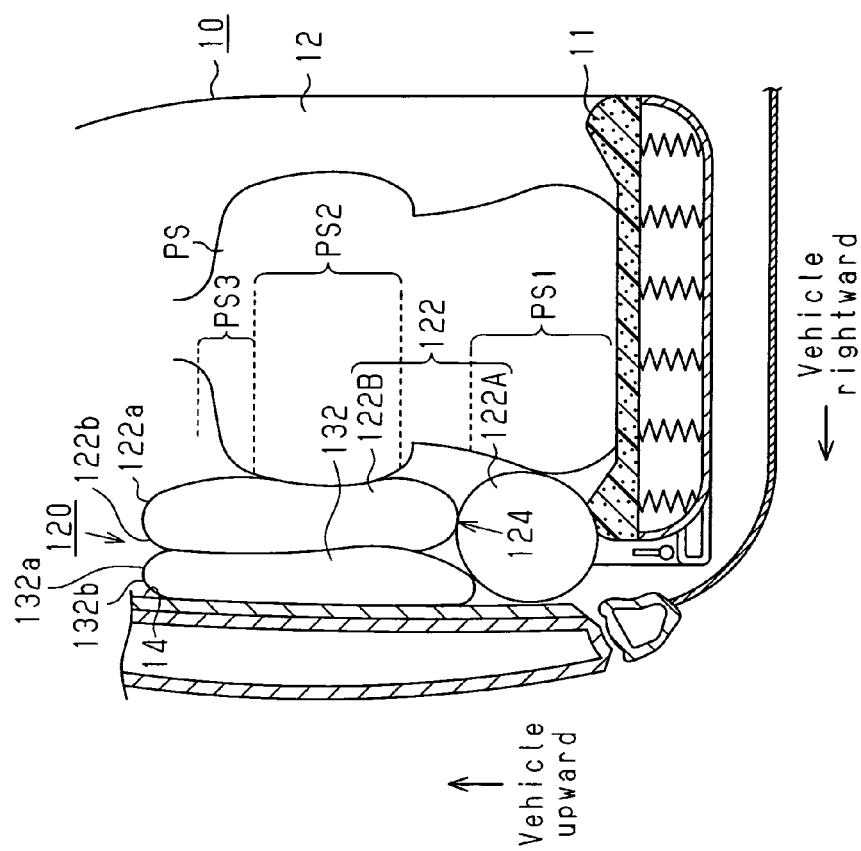
FIG. 3A is a cross-sectional view taken along line A-A of FIG. 2, representing operation of the side airbag apparatus shown in FIG. 1 when the body size of a seated passenger is greater than or equal to a predetermined size.
Figure 3B:
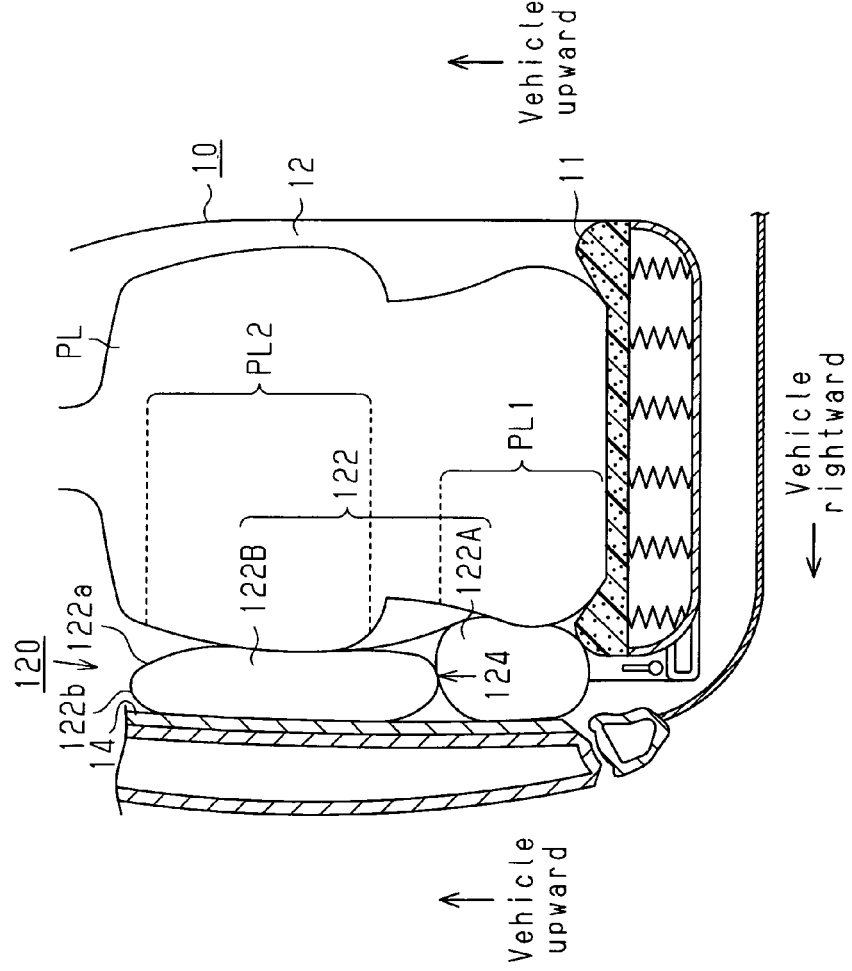
FIG. 3B is a cross-sectional view taken along line A-A of FIG. 2, representing operation of the side airbag apparatus shown in FIG. 1 when the body size of the seated passenger is smaller than the predetermined size.

With reference to FIGS. 3A and 3B, the main airbag 122 is divided into a first portion 122A and a second portion 122B by a seam 124 at which a middle portion of the ground fabric sheet 122a and a middle portion of the ground fabric sheet 122b are sewn together. When the main airbag 122 is fully inflated and deployed, the first portion 122A corresponds to the lumbar region of the passenger on the seat 10, and the second portion 122B corresponds to the body portions of the passenger above the lumbar region. The first portion 122A and the second portion 122B separately receive gas from two gas injection ports formed in the main inflator 121.

After fully inflated and deployed, the main airbag 122 is arranged between the passenger seated on the seat 10 and the side wall portion 14 of the passenger compartment corresponding to the seat 10. The thickness of the first portion 122A in the fully inflated and deployed state in the lateral direction of the vehicle is set in such a manner that, not only when a passenger PL having a body size larger than or equal to the predetermined size shown in FIG. 3A is seated on the seat 10, but also when a passenger PS having a body size smaller than the predetermined size shown in FIG. 3B is seated on the seat 10, the gap between the lumbar region PL1 of the passenger PL or the lumbar region PS1 of the passenger PS and the side wall portion 14 is filled by the first portion 122A in the fully inflated and deployed state. Such thickness of the first portion 122A is greater than the thickness of the second portion 122B in the fully inflated and deployed state in the lateral direction of the vehicle. Regardless of the body size, the lumbar region of the human body is sufficiently robust compared to other parts. The thickness of the first portion 122A in the fully inflated and deployed state thus can be increased to a relatively great value in the above-described manner, without causing a problem.

The second portion 122B is formed in such a manner that, if the body size of the passenger seated on the seat 10 is greater than or equal to the predetermined size, the second portion 122B in the fully inflated and deployed state is arranged in correspondence with the thorax of the passenger (which is, for example, the thorax PL2 of the passenger PL in FIG. 3A). Thus, if the body size of the passenger seated on the seat 10 is smaller than the predetermined size, the second portion 122B in the fully inflated and deployed state is arranged in correspondence with the thorax and a shoulder of the passenger (which are, for example, the thorax PS2 and a shoulder PS3 of the passenger PS in FIG. 3B).

With reference to FIG. 3B, the auxiliary airbag 132 in the fully inflated and deployed state is arranged between the second portion 122B of the main airbag 122 in the fully inflated and deployed state and the side wall portion 14. The dimension of the auxiliary airbag 132 in the fully inflated and deployed state in the up-and-down direction of the vehicle is substantially equal to the corresponding dimension of the second portion 122B of the main airbag 122 in the fully inflated and deployed state. The thickness of the auxiliary airbag 132 in the fully inflated and deployed state in the lateral direction of the vehicle is set in such a manner that, even if the body size of the passenger seated on the seat 10 is smaller than the predetermined size, the auxiliary airbag 132 and the second portion 122B of the main airbag 122 both in the fully inflated and deployed states fulfill the gap between the passenger and the side wall portion 14. In the first embodiment, the thickness of the auxiliary airbag 132 in the fully inflated and deployed state in the lateral direction of the vehicle is substantially equal to the corresponding dimension of the second portion 122B in the fully inflated and deployed state.

If the electronic control unit 50 determines that the level of the impact pressure on the lateral portion of the vehicle detected by the impact pressure sensor 91 is greater than or equal to the predetermined level and the body size of the passenger seated on the seat 10 detected by the body size sensor 92 is greater than or equal to the predetermined size, the electronic control unit 50 actuates the main inflator 121 but maintains the auxiliary inflator 131 in a non-actuated state. As a result, as illustrated in FIG. 3A, the main airbag 122 is inflated and deployed but the auxiliary airbag 132 is not inflated or deployed. Thus, the lower portion of the airbag assembly in the fully inflated and deployed state is formed by the first portion 122A of the main airbag 122, and the upper portion of the airbag assembly in this state is formed by the second portion 122B of the main airbag 122.

Contrastingly, if the electronic control unit 50 determines that the level of the impact pressure on the lateral portion of the vehicle detected by the impact pressure sensor 91 is greater than or equal to the predetermined level and the body size of the passenger seated on the seat 10 detected by the body size sensor 92 is smaller than the predetermined size, the electronic control unit 50 actuates both the main inflator 121 and the auxiliary inflator 131. This inflates and deploys both of the main airbag 122 and the auxiliary airbag 132 as shown in FIG. 3B. Thus, the lower portion of the airbag assembly in the fully inflated and deployed state is formed by the first portion 122A of the main airbag 122, and the upper portion of the airbag assembly in this state is formed by the second portion 122B of the main airbag 122 and the auxiliary airbag 132.

The first embodiment has the following advantages.

In the first embodiment, if the body size of the passenger on the seat 10 is greater than or equal to the predetermined size, only the main airbag 122 is inflated and deployed. However, if the body size of the passenger on the seat 10 is smaller than the predetermined size, the main airbag 122 and the auxiliary airbag 132 are both inflated and deployed. Thus, the thickness of the upper portion of the airbag assembly in the fully inflated and deployed state in the lateral direction of the vehicle is greater in the case in which the body size of the passenger on the seat 10 is smaller than the predetermined size than the case in which the body size of the passenger on the seat 10 is greater than or equal to the predetermined size. This ensures substantially constant airbag performance for restraining the passenger on the seat 10 regardless of whether the passenger on the seat 10 is relatively small-sized and thus a relatively large gap is formed between the passenger and the side wall portion 14 or the passenger on the seat 10 is relatively large-sized. In other words, the airbag performance for restraining the passenger on the seat 10 is prevented from varying depending on the body size of the passenger.

The electronic control unit 50 determines whether the body size of the passenger on the seat 10 is smaller than the predetermined size prior to determination whether the level of the impact pressure on the lateral portion of the vehicle is greater than or equal to the predetermined level. Thus, inflation and deployment of the main airbag 122 and that of the auxiliary airbag 132 are controlled smoothly and quickly in accordance with the body size of the passenger.

Second Embodiment

A second embodiment of the present invention will now be described with reference to FIGS. 4 to 6. The following description focuses on the differences between the second embodiment and the first embodiment.

Figure 4:
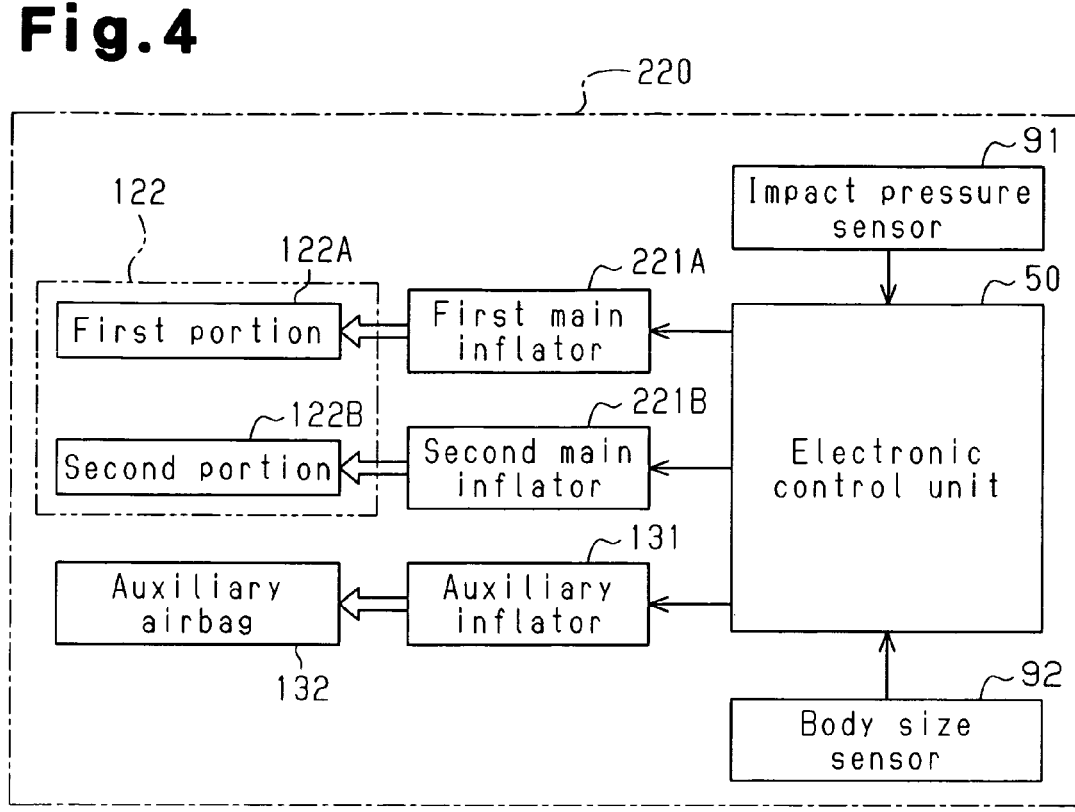
FIG. 4 is a block diagram representing the electric configuration of a side airbag apparatus according to a second embodiment of the present invention.

As illustrated in FIG. 4, a side airbag apparatus 220 according to the second embodiment is different from the side airbag apparatus 120 according to the first embodiment in that the side airbag apparatus 220 has a first main inflator 221A and a second main inflator 221B, which replace the main inflator 121. In other words, in the first embodiment, the first portion 122A and the second portion 122B of the main airbag 122 receive gas commonly from the main inflator 121. Contrastingly, in the second embodiment, the first portion 122A and the second portion 122B of the main airbag 122 receive gas from separate sources, which are the first main inflator 221A and the second main inflator 221B, respectively.

The amount of gas injected by the first main inflator 221A per unit time is equal to the amount of gas injected by the second main inflator 221B per unit time. The amount of gas injected by the auxiliary inflator 131 per unit time is less than or equal to the amount of the gas injected by each of the first and second main inflators 221A and 221B per unit time. If the amount of the gas injected by the auxiliary inflator 131 per unit time is less than the amount of the gas injected by each main inflator 221A, 221B per unit time, the pressure in the auxiliary airbag 132 inflated and deployed by the gas injected by the auxiliary inflator 131 is normally lower than the pressure in the first portion 122A of the main airbag 122, which is inflated and deployed by the gas injected by the first main inflator 221A, or the pressure in the second portion 122B of the main airbag 122, which is inflated and deployed by the gas injected by the second main inflator 221B.

Figure 5A:
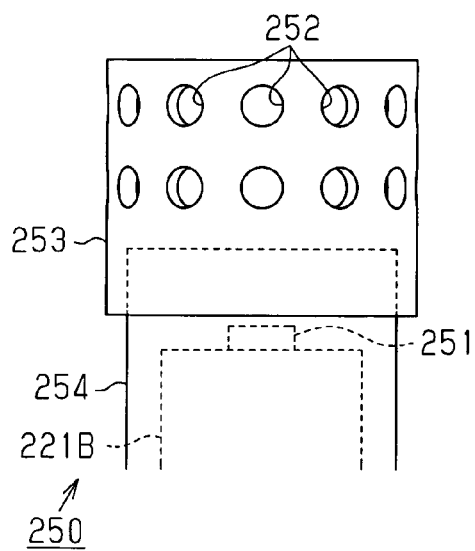
FIGS. 5A and 5B are front views showing internal pressure regulating means of the side airbag apparatus of FIG. 4.
Figure 5B:
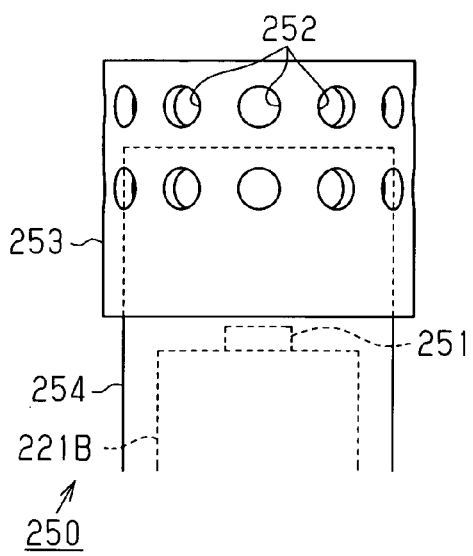

The second main inflator 221B has internal pressure regulating means (an internal pressure regulating mechanism) 250, which regulates the pressure in the second portion 122B by changing the amount of gas sent to the second portion 122B of the main airbag 122 per unit time. As shown in FIGS. 5A and 5B, the internal pressure regulating means 250 has a sliding pipe 254 and a diffuser 253 having a plurality of through holes 252. The sliding pipe 254 is arranged around an end of the second main inflator 221B having a gas injecting portion 251. The diffuser 253 is provided around a distal end of the sliding pipe 254. A non-illustrated actuator actuates the sliding pipe 254 to slide along the axis of the sliding pipe 254 without changing the position of the diffuser 253 relative to the second main inflator 221B.

As the sliding pipe 254 slides, some of the through holes 252 of the diffuser 253 are switched selectively between a closed state and an open state. Specifically, if the electronic control unit 50 determines that the body size of the passenger on the seat 10 is greater than or equal to the predetermined size, the sliding pipe 254 is slid to the position of FIG. 5A at which all of the through holes 252 of the diffuser 253 are open. In this state, the gas injected by the second main inflator 221B is supplied to the second portion 122B of the main airbag 122 through all of the through holes 252 of the diffuser 253. The amount of the gas sent to the second portion 122B per unit time is relatively great. Contrastingly, if the electronic control unit 50 determines that the body size of the passenger on the seat 10 is smaller than the predetermined size, the sliding pipe 254 is slid to the position of FIG. 5B at which some of the through holes 252 of the diffuser 253 are closed. In this state, the gas injected by the second main inflator 221B is supplied to the second portion 122B of the main airbag 122 through the open ones of the through holes 252 of the diffuser 253. The amount of the gas sent to the second portion 122B per unit time is relatively small. Accordingly, the pressure in the second portion 122B in the fully inflated and deployed state is regulated in accordance with the body size of the passenger on the seat 10.

FIG. 6 schematically represents the operations of the side airbag apparatus 220 according to the second embodiment in correspondence with the body size of the passenger on the seat 10. Specifically, if the body size of the passenger on the seat 10 is greater than or equal to the predetermined size, the main airbag 122 is inflated and deployed but the auxiliary airbag 132 is not inflated or deployed. Thus, the thickness of the upper portion of the airbag assembly in the fully inflated and deployed state in the lateral direction of the vehicle is relatively small. Further, in this state, the internal pressure regulating means 250 increases the amount of the gas sent to the second portion 122B of the main airbag 122 per unit time to a relatively great value. The pressure in the second portion 122B in the fully inflated and deployed state thus becomes relatively high. In other words, the pressure in the upper portion of the airbag assembly in the fully inflated and deployed state becomes relatively high.

If the body size of the passenger on the seat 10 is smaller than the predetermined size, the main airbag 122 and the auxiliary airbag 132 are both inflated and deployed. Thus, the thickness of the upper portion of the airbag assembly in the fully inflated and deployed state in the lateral direction of the vehicle is relatively great. Further, in this state, the amount of the gas sent to the second portion 122B of the main airbag 122 per unit time is decreased to a relatively small value by the internal pressure regulating means 250. The pressure in the second portion 122B in the fully inflated and deployed state thus becomes relatively low. That is, the pressure in the upper portion of the airbag assembly in the fully inflated and deployed state becomes relatively low.

Contrastingly, the thickness of the lower portion of the airbag assembly, which is formed by the first portion 122A of the main airbag 122, in the fully inflated and deployed state in the lateral direction of the vehicle and the pressure in the lower portion of the airbag assembly are constant regardless of the body size of the passenger on the seat 10. Such thickness is relatively great and the pressure is relatively high.

The second embodiment has the following advantages.

The pressure in the upper portion of the airbag assembly in the fully inflated and deployed state when the body size of the passenger on the seat 10 is smaller than the predetermined size is lower than the pressure in the upper portion of the airbag assembly in the fully inflated and deployed state when the body size of the passenger on the seat 10 is greater than or equal to the predetermined size. That is, in correspondence with the body size of the passenger on the seat 10, the pressure in the upper portion of the airbag assembly is regulated to an appropriate value. This enhances performance of the airbag assembly for restraining the passenger on the seat 10.

Third Embodiment

A third embodiment of the present invention will hereafter be explained with reference to FIGS. 7 to 8B. The following explanation focuses on the differences between the third embodiment and the first embodiment.

Figure 7:
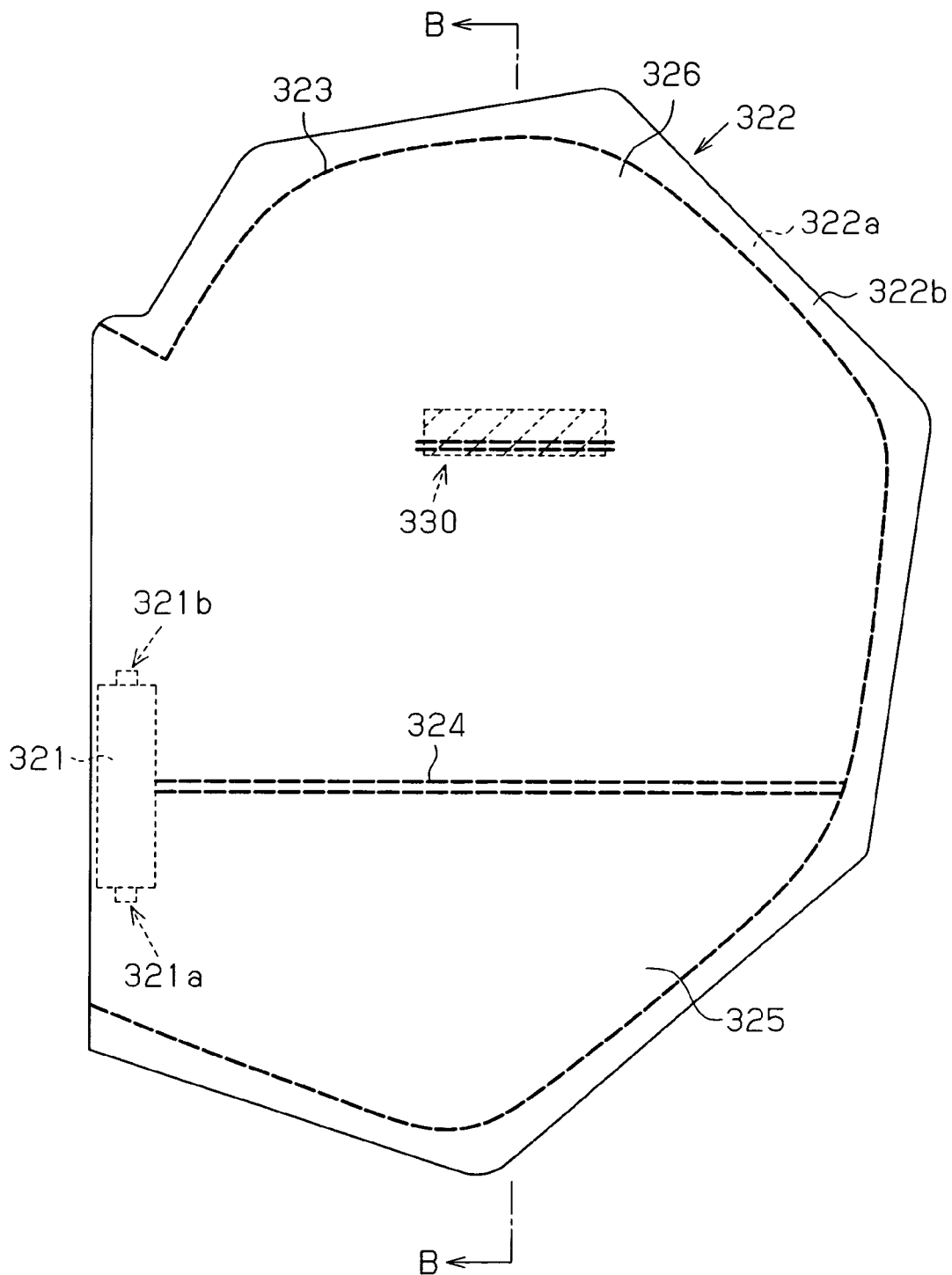
FIG. 7 is a side view showing an airbag in a fully inflated and deployed state and an inflator of a side airbag apparatus according to a third embodiment of the present invention.

A side airbag apparatus according to the third embodiment is different from the side airbag apparatus 120 according to the first embodiment in that the side airbag apparatus of the third embodiment has an airbag 322 shown in FIG. 7, instead of the main airbag 122 and the auxiliary airbag 132.

The airbag 322 is formed by sewing peripheries of a pair of ground fabric sheets 322a, 322b, which are fireproof flexible non-woven fabric sheets, together at a seam 323. When the airbag 322 is fully inflated and deployed, the outer surface of the ground fabric sheet 322a faces the interior of the passenger compartment and the outer surface of the ground fabric sheet 322b faces the exterior. While in the fully inflated and deployed state, the airbag 322 is divided into a lower portion 325 and an upper portion 326 by a seam 324 at which middle portions of the ground fabric sheets 322a, 322b are sewn together.

The airbag 322 is accommodated in one of the sides of the seat back 12 located closer to the exterior of the passenger compartment. The airbag 322 is inflated and deployed in a forward direction of the vehicle from the position. The main inflator 321 is also accommodated in the side of the seat back 12. The main inflator 321 has a gas injecting portion 321a and a gas injecting portion 321b. The main inflator 321 injects gas to the lower portion 325 of the airbag 322 through the gas injecting portion 321a and the upper portion 326 of the airbag 322 through the gas injecting portion 321b.

A tether portion 330 is arranged in the upper portion 326 of the airbag 322 substantially at the center in the front-and-rear direction and the vertical direction of the vehicle. The tether portion 330 connects the ground fabric sheets 322a, 322b together.

Figure 8A:
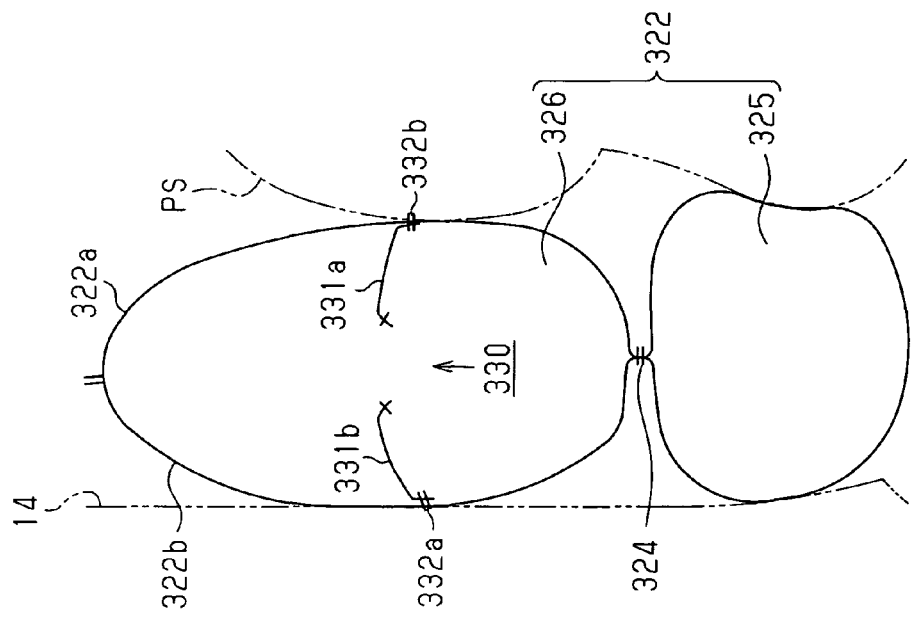
FIG. 8A is a cross-sectional view taken along line B-B of FIG. 7, representing operation of the side airbag apparatus shown in FIG. 7 when the body size of a seated passenger is greater than or equal to the predetermined size.

As shown in FIG. 8A, the tether portion 330 has a first tether 331a and a second tether 331b. The first tether 331a is sewn with the ground fabric sheet 322a at a first seam 332a. The second tether 331b is sewn with the ground fabric sheet 322b at a second seam 332b. The first tether 331a and the second tether 331b are sewn together at a third seam 333. The tensile strength of the third seam 333 is lower than those of the seams 323, 324, 332a, 332b. The third seam 333 is thus broken by a relatively small tensile force exceeding a predetermined level.

If a relatively large-sized passenger PL shown in FIG. 8A is seated on the seat 10, the relatively small gap between the side wall portion 14 and the passenger PL restricts inflation of the upper portion 326 of the airbag 322. This prevents tensile force exceeding the predetermined level from acting on the third seam 333 of the tether portion 330. The third seam 333 is thus prevented from being broken. Thus, in this case, with reference to FIG. 8A, the thickness of the upper portion 326 of the airbag 322 in the fully inflated and deployed state in the lateral direction of the vehicle is relatively small.

Figure 8B:
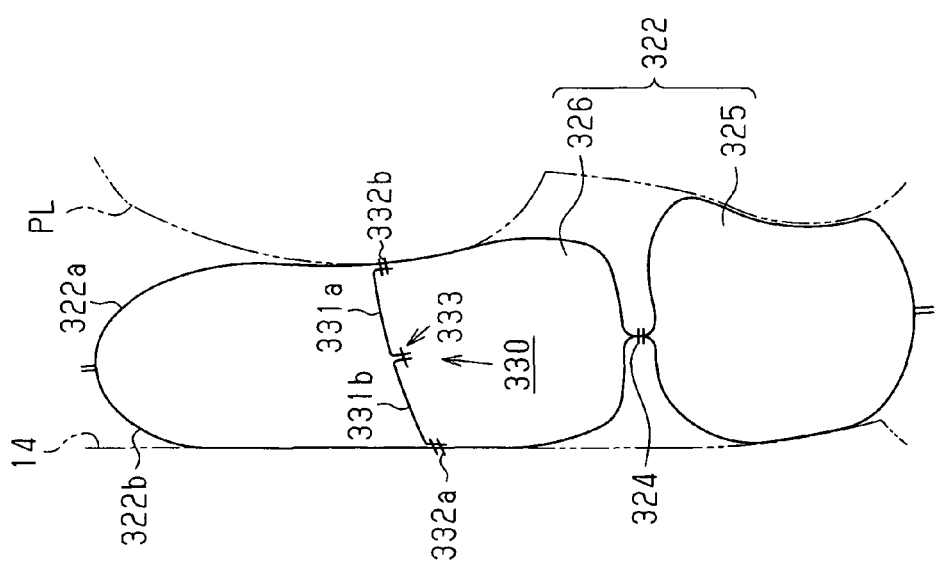
FIG. 8B is a cross-sectional view taken along line B-B of FIG. 7, representing operation of the side airbag apparatus shown in FIG. 7 when the body size of the seated passenger is smaller than the predetermined size.

If a relatively small-sized passenger PS shown in FIG. 8B is seated on the seat 10, the gap between the side wall portion 14 and the passenger PS is relatively great. This inflates the upper portion 326 of the airbag 322 to a relatively large size. Thus, the tensile force exceeding the predetermined level acts on the third seam 333 of the tether portion 330, breaking the third seam 333. Accordingly, with reference to FIG. 8B, the thickness of the upper portion 326 of the airbag 322 in the fully inflated and deployed state in the lateral direction of the vehicle becomes relatively great. Further, in this case, the pressure in the upper portion 326 of the airbag 322 in the fully inflated and deployed state is lower than that of the case in FIG. 8A. This is because the volume of the upper portion 326 of the airbag 322 in the fully inflated and deployed state is greater than that of the case in FIG. 8A.

Contrastingly, the thickness of the lower portion 325 of the airbag 322 in the fully inflated and deployed state in the lateral direction of the vehicle and the pressure in the lower portion 325 are constant regardless of the body size of the passenger on the seat 10. Such thickness is relatively great and the pressure is relatively high.

The third embodiment has the following advantages.

The thickness of the upper portion 326 of the airbag 322 in the fully inflated and deployed state in the lateral direction of the vehicle is changed in accordance with the operation of the tether portion 330. Specifically, if the body size of the passenger on the seat 10 is greater than or equal to the predetermined size, the third seam 333 of the tether portion 330 is prevented from receiving a tensile force sufficiently great for breaking the third seam 333. The third seam 333 is thus not broken. Accordingly, in this case, when the airbag 322 is fully inflated and deployed, the thickness of the upper portion 326 of the airbag 322 is relatively small, and the pressure in the upper portion 326 is relatively high. Contrastingly, if the body size of the passenger on the seat 10 is smaller than the predetermined size, the third seam 333 of the tether portion 330 receives the tensile force sufficiently great for breaking the third seam 333. The third seam 333 is thus broken. Accordingly, in this case, when the airbag 322 is fully inflated and deployed, the thickness of the upper portion 326 of the airbag 322 is relatively great, and the pressure in the upper portion 326 is relatively low. As a result, the airbag performance for restraining the passenger on the seat 10 becomes substantially constant regardless whether the body size of the passenger on the seat 10 is relatively small or relatively large.

The operation of the tether portion 330, which influences the thickness of the upper portion 326 of the airbag 322 in the fully inflated and deployed state and the pressure in the upper portion 326 in this state, is changed in accordance with the tensile force acting on the third seam 333 of the tether portion 330 when the airbag 322 is inflated and deployed. The tensile force acting on the third seam 333 when the airbag 322 is inflated and deployed is influenced directly by the body size of the passenger on the seat 10. Therefore, the thickness of the upper portion 326 of the airbag 322 in the fully inflated and deployed state and the pressure in the upper portion 326 in this state are changed in accordance with the body size of the passenger on the seat 10, even though the side airbag apparatus according to the third embodiment does not have the body size sensor 92, which is shown in FIGS. 1 and 4.

The illustrated embodiments may be modified in the following forms.

In the first and second embodiments, the main airbag 122 is divided into the first portion 122A and the second portion 122B by the seam 124 at which the ground fabric sheets 122a, 122b are sewn together. However, the main airbag 122 may be divided by partially bonding the inner surfaces of the ground fabric sheets 122a, 122b together using adhesive. Alternatively, a tether may form a partition to divide the main airbag 122. The interior of the first portion 122A and the interior of the second portion 122B may partially communicate with each other.

In the third embodiment, the airbag 322 is divided into the lower portion 325 and the upper portion 326 by the seam 324 at which the ground fabric sheets 322a, 322b are sewn together. However, the airbag 322 may be divided by partially bonding the inner surfaces of the ground fabric sheets 322a, 322b together using adhesive. Alternatively, a tether may form a partition to divide the airbag 322. The interior of the lower portion 325 and the interior of the upper portion 326 may partially communicate with each other.

In the second embodiment, the first main inflator 221A and the second main inflator 221B may be replaced by a single inflator having two gas injecting portions. The first portion 122A and the second portion 122B of the main airbag 122 each receive gas from the corresponding one of the gas injecting portions. In this case, it is preferred that the internal pressure regulating means 250 be provided in the gas injecting portion that injects gas into the second portion 122B.

In the second embodiment, the auxiliary airbag 132 in the fully inflated and deployed state is arranged between the side wall portion 14 and the main airbag 122. However, the auxiliary airbag 132 in the fully inflated and deployed state may be provided closer to the interior of the passenger compartment than the main airbag 122. In this case, it is preferred that the internal pressure regulating means 250 regulate the pressure in the auxiliary airbag 132, which is held in contact with the passenger while in the fully inflated and deployed state, rather than the main airbag 122.

In the first embodiment, the main inflator 121 and the auxiliary inflator 131 may be replaced by a single inflator injecting gas commonly to the main airbag 122 and the auxiliary airbag 132. In this case, switching means may be provided to selectively switch between a state in which supply of the gas injected by the inflator to the auxiliary airbag 132 is permitted and a state in which such gas supply is prohibited. For example, the switching means prohibits the gas supply to the auxiliary airbag 132 if the body size of the passenger on the seat 10 is greater than or equal to the predetermined size, and permits the gas supply to the auxiliary airbag 132 if the body size of the passenger on the seat 10 is smaller than the predetermined size. In this case, if the body size of the passenger on the seat 10 is larger than or equal to the predetermined size, the amount of the gas sent to the main airbag 122 per unit time is relatively great, and the pressure in the main airbag 122 in the fully inflated and deployed state is relatively high. Contrastingly, if the body size of the passenger on the seat 10 is smaller than the predetermined size, the amount of the gas sent to the main airbag 122 per unit time is relatively small, and the pressure in the main airbag 122 in the fully inflated and deployed state is relatively low.

In the first and second embodiments, the electronic control unit 50 performs determination of the body size of the passenger seated on the seat 10 in accordance with two categories, which are the body size less than the predetermined sizes and the body size not less than the predetermined size, based on the detection results of the body size sensor 92. However, such determination may be carried out in accordance with three or more categories. In this case, it is preferred that the auxiliary airbags in the side airbag apparatus be increased by the same number as the number of the added categories. That is, the number of the auxiliary airbags becomes greater as the number of the categories, in accordance with which the body size of the passenger on the seat 10 is determined, becomes greater. This allows the thickness of the airbag assembly in the fully inflated and deployed state to be gradually in accordance with the body size of the passenger on the seat 10.

In the first and second embodiments, the main airbag 122 and the auxiliary airbag 132 may be replaced by a single airbag having a plurality of portions, which are aligned in the lateral direction of the vehicle when fully inflated and deployed. In this case, to change the thickness of the airbag in the fully inflated and deployed state in correspondence with the body size of the passenger on the seat 10, the number of the portions in the airbag that are to be inflated is changed in accordance with the body size of the passenger on the seat 10.

Figure 9:
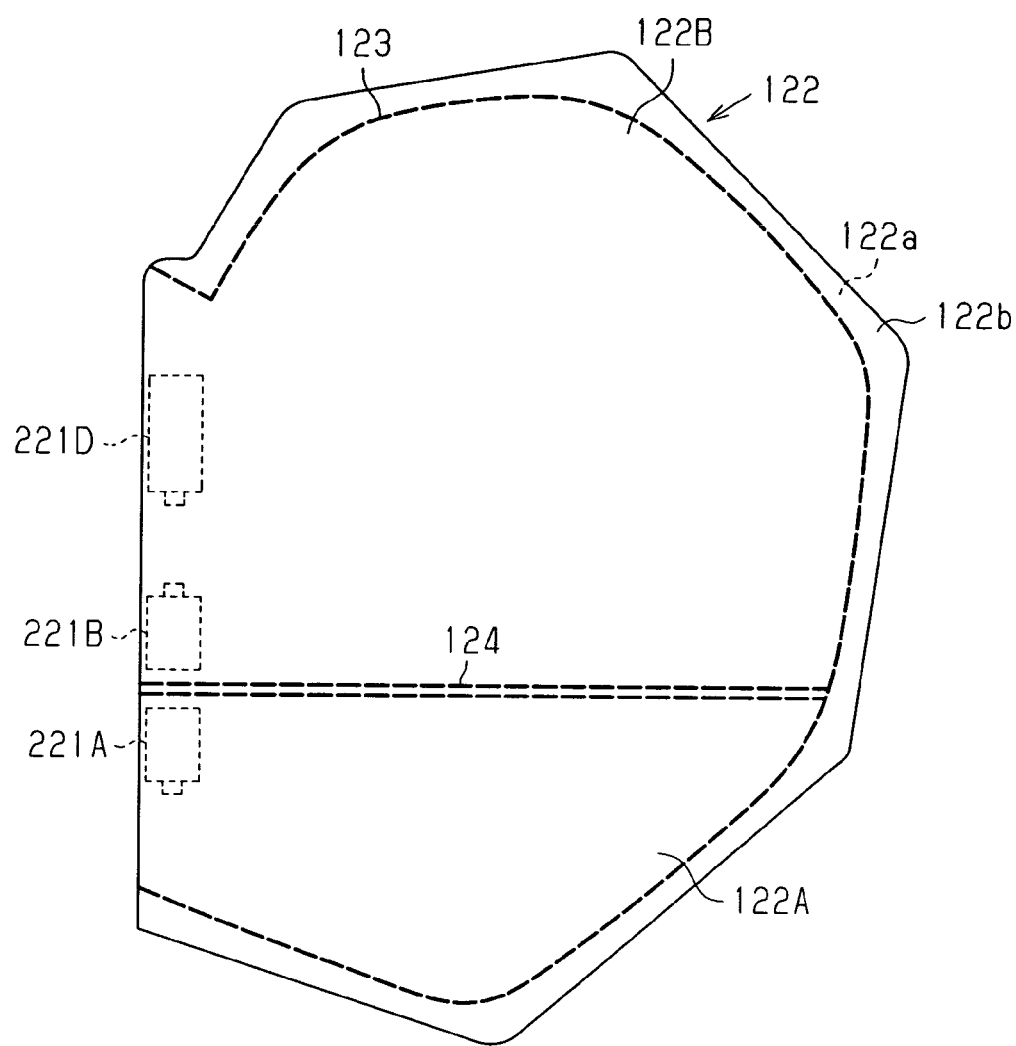
FIG. 9 is a side view showing an airbag in a fully inflated and deployed state and inflators of a side airbag apparatus according to a modification of the present invention.

The internal pressure regulating means 250 is not restricted to the configuration shown in FIGS. 5A and 5B. For example, the side airbag apparatus according to the second embodiment may include an auxiliary inflator 221D serving as internal pressure regulating means (an internal pressure regulating mechanism) as shown in FIG. 9. The auxiliary inflator 221D injects gas into the second portion 122B of the main airbag 122. If it is determined that the body size of the passenger on the seat 10 is greater than or equal to the predetermined size, the auxiliary inflator 221D operates to inflate and deploy the second portion 122B together with the second main inflator 221B. As a result, the amount of the gas sent to the second portion 122B per unit time becomes relatively great. The pressure in the second portion 122B in the fully inflated and deployed state thus becomes relatively high. Contrastingly, if it is determined that the body size of the passenger on the seat 10 is smaller than the predetermined size, the auxiliary inflator 221D is not actuated. The second portion 122B of the main airbag 122 is thus inflated and deployed solely through operation of the second main inflator 221B. As a result, the amount of the gas introduced into the second portion 122B per unit time becomes relatively small. The pressure in the second portion 122B in the fully inflated and deployed state thus becomes relatively low. Alternatively, the side airbag apparatus may include a plurality of auxiliary inflators. In this case, by operating a greater number of auxiliary inflators as the body size of the passenger on the seat 10 becomes greater, the pressure in the second portion 122B in the fully inflated and deployed state may be gradually changed in accordance with the body size of the passenger.

Figure 10A:
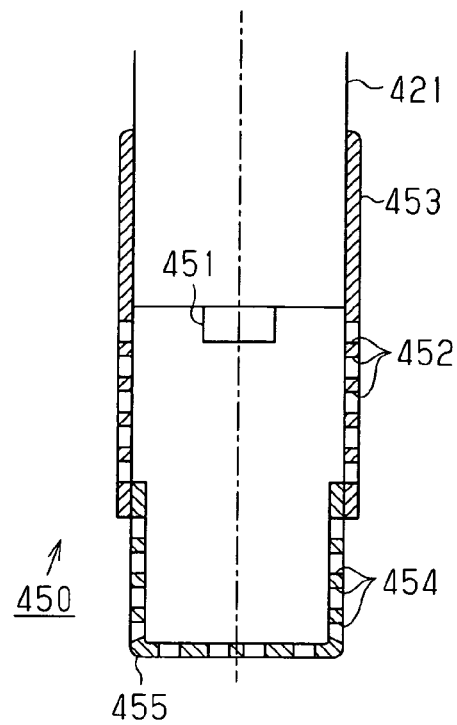
FIGS. 10A and 10B are cross-sectional views showing internal pressure regulating means of a side airbag apparatus according to another modification of the present invention.
Figure 10B:
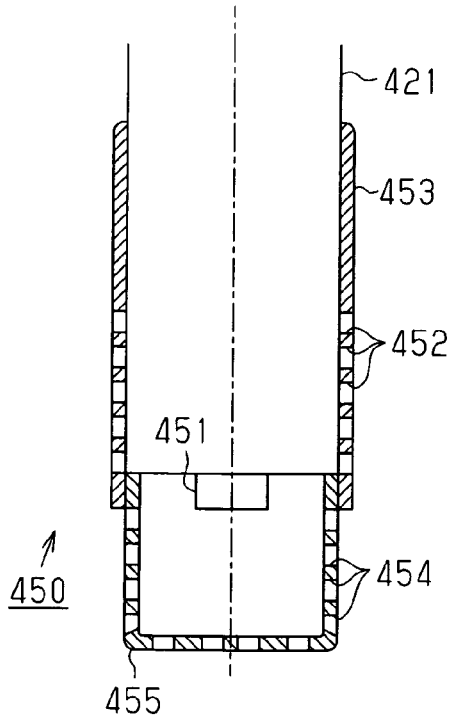
Figure 12A:
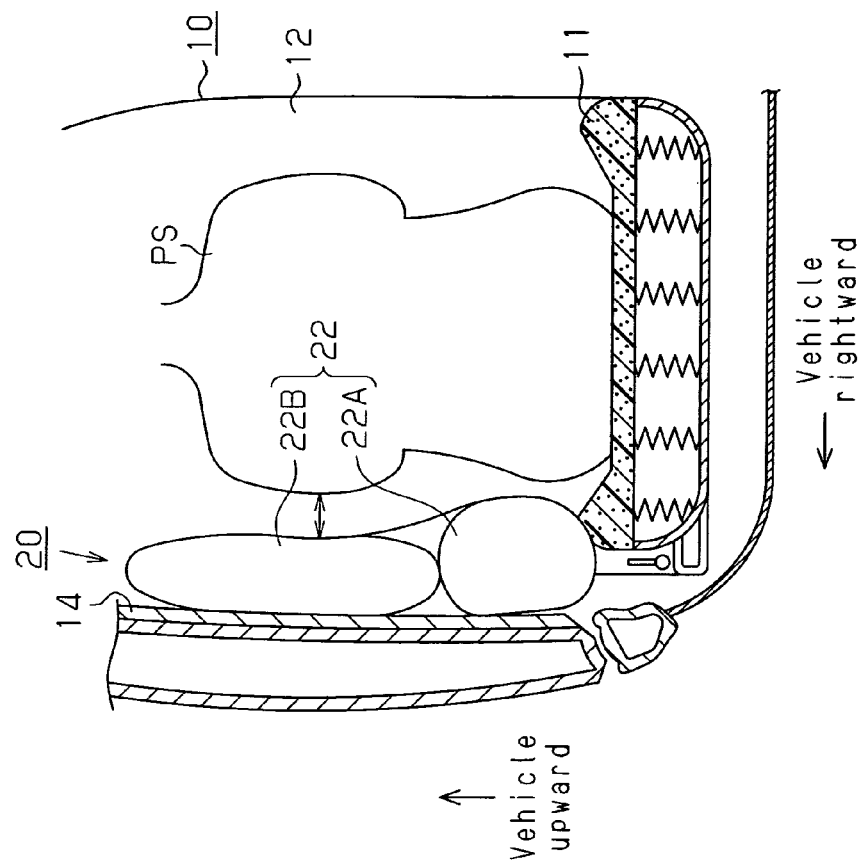
FIGS. 12A and 12B are cross-sectional views representing operation of a conventional side airbag apparatus.
Figure 12B:
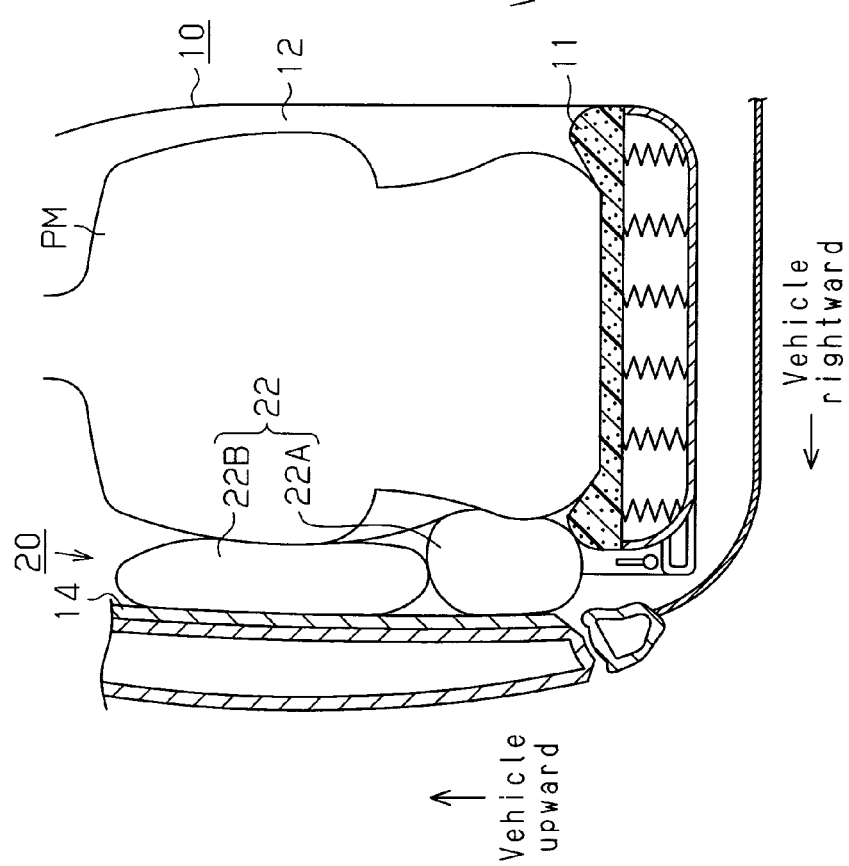

The internal pressure regulating means 250 may be replaced by internal pressure regulating means (an internal pressure regulating mechanism) 450, which is shown in FIGS. 10A and 10B. The internal pressure regulating means 450 has a cylindrical diffuser 453 having a plurality of through holes 452 and a cooling filter 455 having a plurality of filter bores 454. The diffuser 453 is arranged around an end of a pyro-type inflator 421 having a gas injecting portion 451. The cooling filter 455 is secured to the distal end of the diffuser 453. A non-illustrated actuator actuates the diffuser 453, along with the cooling filter 455, to slide along the axis of the diffuser 453. Specifically, if it is determined that the body size of the passenger on the seat 10 is greater than or equal to the predetermined size, the diffuser 453 is slid to the position of FIG. 10A at which the cooling filter 455 is spaced from the gas injecting portion 451 by a relatively great distance. In this case, most of the heated gas that has been injected through the gas injecting portion 451 is sent to the airbag via the through holes 452 of the diffuser 453. Since the temperature and the pressure of the gas sent to the airbag through the through holes 452 of the diffuser 453 are not lowered, the pressure in the airbag in the fully inflated and deployed state becomes relatively high. Contrastingly, if it is determined that the body size of the passenger on the seat 10 is smaller than the predetermined size, the diffuser 453 is slid to the position of FIG. 10B at which the cooling filter 455 is close to the gas injecting portion 451. In this case, all of the heated gas that has been injected through the gas injecting portion 451 is sent to the airbag through the filter bores 454 of the cooling filter 455. Since the cooling filter 455 cools the gas when the gas passes through the filter bores 454, the temperature and the pressure of the gas are lowered. Accordingly, the pressure in the airbag in the fully inflated and deployed state becomes relatively low. It is preferred that the cooling filter 455 be formed of material having a greater heat capacity than the material of the diffuser 453.

Instead of the internal pressure regulating means 250, a vent hole selectively permitting and prohibiting communication between the interior and the exterior of the airbag may be provided in the airbag as internal pressure regulating means (an internal pressure regulating mechanism). In this case, if it is determined that the body size of the passenger on the seat 10 is greater than or equal to the predetermined size, the vent hole is blocked to disconnect the interior of the airbag from the exterior. If it is determined that the body size of the passenger on the seat 10 is smaller than the predetermined size, the vent hole becomes open to permit communication between the interior of the airbag and the exterior.

In the third embodiment, the first tether 331a and the second tether 331b of the tether portion 330 may be bonded together using adhesive instead of being sewn together at the third seam 333. However, in this case, the first tether 331a and the second tether 331b needs to be separated from each other by a relatively small tensile force exceeding a predetermined level. Alternatively, the tether portion 330 may be formed by a single tether that is broken by a relatively small tensile force exceeding a predetermined level, instead of the first and second tethers 331a, 331b.

In the third embodiment, the third seam 333 at which the first tether 331a and the second tether 331b of the tether portion 330 are sewn together is broken by a tensile force exceeding a predetermined level. However, the third seam 333 may be cut by cutting means that operates in response to the tensile force acting on the tether portion 330. The cutting means does not necessarily have to cut the third seam 333 but may cut the first tether 331a or the second tether 331b. Alternatively, the cutting means may cut the first seam 332a, at which the first tether 331a is sewn with the ground fabric sheet 322a, or the second seam 332b, at which the second tether 331b is sewn with the ground fabric sheet 322b.

In the third embodiment, the tether portion 330 may be replaced by a device 530 shown in FIGS. 11A and 11B. The device 530 includes a tether 531 and an actuator 532. The tether 531 connects a pair of ground fabric sheets forming the airbag 322. The actuator 532 adjusts the length of the tether 531 to regulate the thickness of an upper portion 326 of the airbag 322 in the lateral direction of the vehicle. In this case, if it is determined that the body size of the passenger on the seat 10 is greater than or equal to the predetermined size, the actuator 532 operates to decrease the length of the tether 531, as illustrated in FIG. 10A. The thickness of the upper portion 326 in the fully inflated and deployed state in the lateral direction of the vehicle thus becomes relatively small. Contrastingly, if it is determined that the body size of the passenger on the seat 10 is smaller than the predetermined size, the actuator 532 operates to increase the length of the tether 531, as illustrated in FIG. 10B. The thickness of the upper portion 326 in the fully inflated and deployed state in the lateral direction of the vehicle thus becomes relatively great.

The seam 124, which defines the first portion 122A and the second portion 122B of the main airbag 122, may be omitted from the first and second embodiments. In this case, the interior of the first portion 122A and the interior of the second portion 122B communicate with each other.

The seam 324, which separates the lower portion 325 and the upper portion 326 of the airbag 322 from each other, may be omitted from the third embodiment. In this case, the interior of the lower portion 325 and the interior of the upper portion 326 communicate with each other.

In the first and second embodiments, the inflation and deployment of the main airbag 122 and the auxiliary airbag 132 are controlled in such manner that, when the body size of the passenger seated on the seat 10 is smaller than the predetermined size, the upper portion of the airbag assembly in the fully inflated and deployed state has a greater thickness in the lateral direction of the vehicle compared to that in the case where the body size of the passenger is greater than or equal to the predetermined size. However, the inflation and deployment of the main airbag 122 and the auxiliary airbag 132 may be controlled in such manner that, when the body size of the passenger seated on the seat 10 is smaller than the predetermined size, the upper portion of the airbag assembly in a partially inflated and deployed state has a greater thickness in the lateral direction of the vehicle compared to that in the case where the body size of the passenger is greater than or equal to the predetermined size.

In the third embodiment, the inflation and deployment of the airbag 322 are controlled in such manner that, when the body size of the passenger seated on the seat 10 is smaller than the predetermined size, the upper portion 326 of the airbag 322 in the fully inflated and deployed state has a greater thickness in the lateral direction of the vehicle compared to that in the case where the body size of the passenger is greater than or equal to the predetermined size. However, the inflation and deployment of the airbag 322 may be controlled in such manner that, when the body size of the passenger seated on the seat 10 is smaller than the predetermined size, the upper portion 326 of the airbag 322 in a partially inflated and deployed state has a greater thickness in the lateral direction of the vehicle compared to that in the case where the body size of the passenger is greater than or equal to the predetermined size.

In the first embodiment, the inflation and deployment of the main airbag 122 are controlled in such manner that, when the body size of the passenger seated on the seat 10 is smaller than the predetermined size, the upper portion of the airbag assembly in the fully inflated and deployed state has a lower internal pressure compared to that in the case where the body size of the passenger is greater than or equal to the predetermined size. However, the inflation and deployment of the main airbag 122 may be controlled in such manner that, when the body size of the passenger seated on the seat 10 is smaller than the predetermined size, the upper portion of the airbag assembly in a partially inflated and deployed state has a lower internal pressure compared to that in the case where the body size of the passenger is greater than or equal to the predetermined size.

In the third embodiment, the inflation and deployment of the airbag 322 are controlled in such manner that, when the body size of the passenger seated on the seat 10 is smaller than the predetermined size, the upper portion 326 of the airbag 322 in the fully inflated and deployed state has a lower internal pressure compared to that in the case where the body size of the passenger is greater than or equal to the predetermined size. However, the inflation and deployment of the airbag 322 may be controlled in such manner that, when the body size of the passenger seated on the seat 10 is smaller than the predetermined size, the upper portion 326 of the airbag 322 in a partially inflated and deployed state has an lower internal pressure compared to that in the case where the body size of the passenger is greater than or equal to the predetermined size.

The invention claimed is:

1. A side airbag apparatus mounted in a vehicle, comprising an airbag that protects a passenger seated on a seat in a passenger compartment in a collision of the vehicle by being inflated and deployed at a side wall portion of the passenger compartment corresponding to the seat,
    wherein, if a body size of the passenger is smaller than a predetermined size, inflation and deployment of the airbag are controlled in such a manner that the airbag in a inflated and deployed state has a great thickness in a lateral direction of the vehicle compared to a case in which the body size of the passenger is greater than or equal to the predetermined size
    wherein the airbag is an airbag assembly including a main airbag and an auxiliary airbag that inflate and deploy in a state arranged along the lateral direction of the vehicle,
    wherein the main airbag is inflated and deployed and the auxiliary airbag is not inflated or deployed if the body size of the passenger is greater than or equal to the predetermined size, and
    wherein the main airbag and the auxiliary airbag are both inflated and deployed if the body size of the passenger is smaller than the predetermined size.

2. The apparatus according to claim 1, wherein the airbag in the inflated and deployed state has a lower portion corresponding to a lumbar region of the passenger and an upper portion corresponding to a portion of the body above the lumbar region of the passenger, and
    wherein the inflation and deployment of the airbag are controlled in such a manner that, if the body size of the passenger is smaller than the predetermined size, the upper portion of the airbag in the inflated and deployed state has a great thickness in the lateral direction of the vehicle compared to the case in which the body size of the passenger is greater than or equal to the predetermined size.

3. The apparatus according to claim 2, wherein the lower portion of the airbag in the inflated and deployed state has a constant thickness in the lateral direction of the vehicle regardless of the body size of the passenger.

4. The apparatus according to claim 2, wherein the upper portion of the airbag in the inflated and deployed state corresponds at least to a thorax of the passenger.

5. The apparatus according to claim 4, wherein the upper portion of the airbag in the inflated and deployed state corresponds to the thorax and a shoulder of the passenger if the body size of the passenger is smaller than the predetermined size and to the thorax of the passenger if the body size of the passenger is greater than or equal to the predetermined size.

6. The apparatus according to claim 1, wherein the auxiliary airbag in the inflated and deployed state is arranged between the side wall portion and the main airbag in the inflated and deployed state.

7. The apparatus according to claim 1, further comprising a body size sensor that detects the body size of the passenger when the passenger sits on the seat, wherein the thickness of the airbag in the lateral direction of the vehicle is adjusted based on a detection result obtained in advance by the body size sensor.

8. The apparatus according to claim 1, wherein the inflation and deployment of the airbag is further controlled in such a manner that, if the body size of the passenger is smaller than the predetermined size, a pressure in the airbag in the inflated and deployed state becomes low compared to the case in which the body size of the passenger is greater than or equal to the predetermined size.

9. The apparatus according to claim 8, wherein the airbag in the inflated and deployed state has a lower portion corresponding to a lumbar region of the passenger and an upper portion corresponding to a portion of the body above the lumbar region of the passenger, and
    wherein the inflation and deployment of the airbag are controlled in such a manner that, if the body size of the passenger is smaller than the predetermined size, the pressure in the upper portion in the inflated and deployed state becomes low compared to the case in which the body size of the passenger is greater than or equal to the predetermined size.

10. The apparatus according to claim 9, wherein a pressure in the lower portion of the airbag in the inflated and deployed state is constant regardless of the body size of the passenger.

11. The apparatus according to claim 8, wherein the pressure in the airbag is adjusted by changing an amount of gas sent to the airbag per unit time.

12. The apparatus according to claim 8, further comprising a main inflator and an auxiliary inflator that inject gas into the airbag,
    wherein, if the body size of the passenger is smaller than the predetermined size, the main inflator is actuated and the auxiliary inflator is maintained in a non-actuated state, and
    wherein, if the body size of the passenger is greater than or equal to the predetermined size, the main inflator and the auxiliary inflator are both actuated.

13. The apparatus according to claim 8, further comprising a body size sensor detecting the body size of the passenger when the passenger sits on the seat, wherein the pressure in the airbag is adjusted based on a detection result obtained in advance by the body size sensor.

* * * * *